United States Patent [19]
Miekka et al.

[11] Patent Number: 5,903,118
[45] Date of Patent: May 11, 1999

[54] DISC ROTOR AIR COOLED D.C. MOTOR

[76] Inventors: Fred N. Miekka, 234 San Gabriel Ct.; Peter W. Mackie, 276 Grandview Ave., both of Sierra Madre, Calif. 91024

[21] Appl. No.: 08/991,926

[22] Filed: Dec. 16, 1997

Related U.S. Application Data

[60] Provisional application No. 60/035,628, Jan. 16, 1997.

[51] Int. Cl.⁶ .................................................. H02K 11/00
[52] U.S. Cl. ............................................ 318/254; 318/480
[58] Field of Search ........................... 310/62, 63, 67 R, 310/51, 686, 90, 12, 156, 82; 318/254, 139; 74/573 R

[56] References Cited

U.S. PATENT DOCUMENTS

| | | | |
|---|---|---|---|
| 3,828,212 | 8/1974 | Harkness et al. | 310/153 |
| 4,458,554 | 7/1984 | Hrastar | 74/573 R |
| 5,075,606 | 12/1991 | Lipman | 318/254 |
| 5,179,307 | 1/1993 | Porter | 310/68 R |
| 5,633,545 | 5/1997 | Albrecht et al. | 310/67 R |
| 5,661,351 | 8/1997 | Von Der Heide et al. | 310/67 R |
| 5,691,681 | 11/1997 | Okugawa | 335/284 |

*Primary Examiner*—William M. Shoop, Jr.
*Assistant Examiner*—Rita Leykin

[57] ABSTRACT

A brushless direct current (DC) electric motor includes a rotor and a stator. The rotor has at least one disc mounted to a central shaft. The disc has an outer portion consisting of permanent magnets. The magnets are mounted with their direction of magnetization transversing through the disc. The stator includes C-shaped electromagnets which straddle the disc and are mounted with their magnetic poles aligned in coupling proximity to the poles of the permanent magnets in the disc. Position circuitry senses a position of the permanent magnets with respect to the electromagnets and then provides a signal based on the position to the electromagnets to cause the rotor to rotate.

39 Claims, 11 Drawing Sheets

DISC ROTOR AIR COOLED D.C. MOTOR

This application claims benefit of Provisional Application Ser. No. 60/035,628, filed Jan. 16, 1997.

FIELD OF THE INVENTION

The present invention relates to electric motors and, more particularly, to direct current electric motors suitable for reliably and efficiently powering electric vehicles and industrial machinery.

BACKGROUND OF THE INVENTION

There are numerous electric motors available for propelling electric automobiles. These include both direct current (DC) motors designed to drive directly off of the batteries and alternating current (AC) motors which require electrical circuitry for converting the DC power in the batteries to AC power. The most efficient of these AC motors requires three or more phase power.

Such motors have a high power-to-weight ratio, can be made to run efficiently, and are inherently reliable because of their brushless design. A disadvantage of such motors is the fact that the battery power must be first converted to AC before it can be used by the motor. This disadvantage shows up in the need for complex circuitry. This is especially true for three-AC motors having three or more phases. Along with the need for complex circuitry is the fact that the failure of a single electrical component in the system can result in total failure of the drive circuitry for producing AC power. This results in DC electric power in the batteries, and a motor that requires AC power. This renders the entire drive system useless.

Therefore, such AC drive systems suffer from the potential of leaving the driver stranded. Despite these obstacles, companies such as AC Propulsion Inc. have made considerable advances in the use of AC motors in electric cars. In particular, high power-to-weight ratios have been achieved.

In the powering of industrial machinery, in many applications it is desirable to have an electric motor that is capable of producing considerable amounts of torque and power at relatively low RPM values. This is normally achieved by gearing the motor down, however this practice results in added moving parts, increased mechanical losses, and adds cost and complexity to the overall system. In general DC electric motors have good torque characteristics which make them ideal for use in many industrial applications. In general with DC electric motors, the more mechanical drag on the motor, the more torque is produced. In this respect such motors are ideal for propelling electric cars as well. The reasons for this are outlined below.

DC electric motors require little circuitry to drive them from batteries. In some cases they can be wired directly with only a switch to turn the system on and off. Another advantage offered by DC electric motors is the fact such motors do not require starting circuitry in the way that many AC motors do.

The first electric cars were produced at the turn of the century and were powered by DC electric motors. Such motors utilized two sets of electromagnets to produce their torque. One set was mounted to the inside of the motor casing. These electromagnets had one set of poles facing inward, and their other set of poles against the steel casing to magnetically connect them in series. The motor casing with its electromagnets made up the stator portion of the motor. When power was on, these electromagnets maintained the same field. At each end of the motor casing were end caps having holes which were centrally located which supported a bushing or bearing through which the rotational portion (or rotor) was supported. The rotor consisted of a round shaft having a larger diameter set of electromagnet windings wound onto an iron core. The ends of the rotor electromagnet windings were fixed to conductive copper strips that were insulated from each other and the motor casing using resin or other suitable insulating material. A set of brushes which were usually made of graphite pushed up against the copper strips in the rotor to make electrical contact while also allowing the rotor to rotate. The position of the brushes relative to the stator electromagnet windings was always set so that the proper rotor electromagnets were turned on at the appropriate times by the brushes to always magnetically drive the rotor in the same direction (i.e., by interaction of the stator magnetic field with the magnetic field of the electromagnets in the rotor).

While these motors were suitable for powering both electric cars, as well as industrial equipment, their efficiency was somewhat limited by the fact that power losses occurred in both sets of electromagnets due to the resistance of their windings.

In the early 1930s, the General Electric Company developed the first permanent magnets that were strong enough to replace one set of electromagnet windings in DC motors. This permanent magnet material was called Alnico, and soon several grades were made commercially available. Shortly thereafter, the first permanent magnet motors began to appear. These motors basically used permanent magnets to replace the stator electromagnets. While these motors had an increased efficiency when compared to their predecessors, they suffered from the possibility of demagnetization of the permanent magnets if the electromagnetic field in the rotor exceeded the "cohesive force" (a measure of the resistance to demagnetization of permanent magnets) of the permanent magnets in the stator. To partially alleviate this problem, stronger ceramic permanent magnets were developed, and still stronger magnets called "Rare Earth Magnets" are among the most recent developments.

When using these strong Rare Earth Magnets, it is common practice to use with them heavy steel motor casings for the purposes of magnetically connecting them to concentrate their flux to within the motor. This practice somewhat counteracts the light-weight benefits offered by rare earth permanent magnets. In addition, extra long electromagnet core lengths are needed to efficiently supply enough magnetic flux to properly utilize such magnets. Thus, it is highly desirable to utilize an electromagnet to permanent magnet geometry which provides for both long electromagnet core lengths as well as eliminating the need for heavy steel motor casings.

Further improvements involve the elimination of brushes by first inverting the construction of the motor so that the electromagnets are in the stator, and the permanent magnets are in the rotor. Secondly, using sensors and transistor circuitry to properly time and provide pulses of electricity to the stator electromagnets to cause the rotor to rotate. Thus, these brushless DC motors have improved reliability compared to brush timed motors.

Despite these improvements, all electric motors have resistive losses in their electromagnet windings which generate considerable amounts of heat. Because of this generation of heat, many motors, both AC and DC, are equipped with a small fan blade mounted onto the motor shaft on the inside of the motor to move air through the motor for the purposes of cooling. In the case of DC motors, the greatest amount of heat is generated under high load conditions. Because of this fact, coupled with the fact that under such conditions motor RPM values are low, insufficient volumes of air are available to adequately cool the motor. This leads to the undesirable risk of overheating the motor under heavy load conditions. Because of this, it is often practice to mount an external fan powered by a separate power source to continuously blow high volumes of air through the motor. Although efficient for motor cooling under low RPM heavy load conditions, the extra fan motor adds to the complication of the system.

In addition to the overheating issue, the overall power of DC permanent magnet motors is proportional to the amount of permanent magnet material that can be magnetically cycled through the field produced by the electromagnets. To achieve a high rate of magnetic cycling at relatively low RPM values, employing a large diameter rotor is beneficial.

Increasing the rotor diameter has the added benefit of increasing the surface speed at the edge resulting in an increase in air motion within the motor. This increased airflow helps the motor to remain cool. Such large diameter motors can be made considerably compact in overall thickness by making the rotary portion into the shape of a thin planar disc. Airflow can be increased by modification of the disc. For example the surfaces may be given a rough texture to enhance the natural air motion associated with the rotation of such disc-shaped rotors, or alternatively blades, rotary vanes, or even an internal turbofan can be added.

In such disc-shaped large diameter rotors, high surface speeds around the periphery are easily achieved along with considerable forces in a radial direction during running. As an example, a 24" diameter rotor rotating at 3,000 RPM will have a surface speed at the edge of about 200 miles per hour. With 5 pounds of permanent magnets around the periphery, in addition to a couple of pounds of other materials, about 27,000 pounds of centrifugal force would be present in a radial direction. Because of these radial forces, strong materials need to be used. One solution is to use composite materials such as carbon fiber. These materials are strong and lightweight. They also do not easily conduct electricity like metals and therefore would not contribute to inductive losses. Another option is to use steel spokes that are flat and sandwiched on both sides by permanent magnets. Although steel is normally not a good choice of material due to its electrical and magnetic properties, when sandwiched between two permanent magnets it will somewhat resist the losses normally present when solid steel is subjected to rapidly changing magnetic fields. In this respect the steel present at the center of such a sandwich construction behaves in a similar manner to the steel casing in ordinary DC electric motors. It becomes part of the magnetic circuit, however being somewhat shielded from changing magnetic fields, does not appreciably add to either inductive or hysteresis loss.

As mentioned earlier it may be desirable to incorporate a turbofan into the rotary portion of the disc-shaped rotor of this invention. Such a turbofan must be capable of moving large volumes of air under low RPM values.

An example of such a turbofan is outlined in U.S. Pat. No. 5,075,606 by Leonard H. Lipman in which the author uses this turbofan design to move large volumes of air at low RPM values by maximizing the available cross section. The impeller portions of such a turbofan are ideal for cooling the large-diameter DC permanent magnet motors of this invention.

Other blade configurations for moving air are also possible. For example, flexible strips of thin film plastic material can be fastened to the periphery of the disc. These plastic strips are initially made to protrude from the edge in a radial direction. These flexible plastic strips move modest quantities of air past the electromagnets under low RPM conditions. As the rotor velocity increases, aerodynamic drag bends these strips back. This alters their shape, reducing their drag effect on the rotor; however, it still maintains enough airflow to prevent overheating of the electromagnets.

A rotating flat disc naturally moves some air with it. This airflow will help to cool the motor. If the surfaces of such a disc are made somewhat rough in texture, this airflow can be enhanced. This is especially true for disc rotors of considerable diameter. This is because the surface speed at the periphery of such discs can be quite high. As earlier mentioned, a 24" diameter disc rotating at 3,000 RPM has a speed of 200 miles per hour at the periphery.

All DC permanent magnet motors run the risk of demagnetization of their permanent magnets if the electromagnetic field of the windings exceed the cohesive force of the permanent magnets. To alleviate this problem, a maximum safe voltage for any DC permanent magnet motor is specified which under maximum power conditions (i.e., at stall) the resistance of the electromagnet windings will be high enough to prevent a flow of current through the electromagnet sufficient to cause irreversible damage to the permanent magnets. This current is considerably greater than the normal operating current, and for this reason, normal operating conditions for traditional permanent magnet DC electric motors only utilize a fraction of their true power capabilities based on their permanent magnets. In fact, most of these motors only utilize between 10% and 25% of their true potential.

The wire diameter used in winding an electromagnet core basically determines the magnetization force in ampere-turns for a given cross-sectional core diameter at a given voltage. Increasing the number of turns reduces the number of amperes that will flow through the coil but increases the number of turns, thus maintaining the same number of ampere turns. In order to more effectively use the permanent magnets of a permanent magnet motor under normal running conditions (i.e., at 10% to 25% of stall current) electromagnet windings must be activated that are more than capable of demagnetizing the permanent magnets in the motor under the conditions of stall. This is effectively accomplished by winding the electromagnet in layers having very thick electromagnet wire on the first windings against the core of the electromagnet and using thinner wire successively in the outer layers. On start up, all the layers of wire in the electromagnet are used. The resistance of the thinner wire prevents excessive currents in the motor, thus preventing demagnetization of the motor permanent magnets. Once the motor RPM value reaches a safe level, the outer layers are shunted, thus increasing the ampere turns in the motor and increasing the utilization of the motor permanent magnets. An interlock is also provided that prevents accidental activation of the shunt mechanism under stall or low RPM conditions. Thus, it is entirely possible to increase the utilization of permanent magnet material in DC permanent magnet motors under normal running conditions.

This increased utilization of permanent magnets during running conditions combined with the relatively large disc diameter results in an electric motor having exceptionally high torque values. This reduces the amount of gearing needed for electric vehicles and industrial machinery. This results in lowered drive train mechanical losses accompanied by increased overall mechanical efficiency.

In view of the foregoing, it is an object of this invention to provide a brushless DC permanent magnet motor capable of adequately utilizing high-strength rare earth permanent magnets by providing long electromagnet core lengths.

It is a further object of this invention to provide an electromagnet to permanent magnet geometry which eliminates the need for using heavy steel motor casings in motors using rare earth magnets.

It is a further object of this invention to adequately utilize high-strength rare earth permanent magnets under normal running conditions by incorporating several sets of electromagnet windings having thicker wire which are selectively activated as the motor RPM increases.

It is a further object of this invention to adequately utilize ceramic permanent magnets under normal running conditions by incorporating several sets of electromagnet windings having thicker wire which are selectively activated as the motor RPM increases.

It is a further object of this invention to provide a means of adequately cooling the high power motor of this invention by employing a built in turbofan, adding vanes, or roughening the surface of the rotor disc of this invention to move large quantities of air over the electromagnet windings at relatively low RPM values.

It is yet another object of this invention to achieve high torque values in an electric motor by providing a rotor consisting of a large diameter disc, and driving this rotary disc from the edge.

SUMMARY OF THE INVENTION

In summary, the present invention provides a large diameter brushless DC electric motor comprising a thin rotor or rotatable portion and a stator or stationary portion. The rotor is comprised of a disc having an inner portion consisting of a reinforced turbofan impeller fixedly mounted to a shaft and an outer ring portion having rare earth permanent magnets fixedly mounted with their direction of magnetization transversing through the disc.

The stator portion of the motor consists of C-shaped electromagnets which straddle the disc and are mounted having their magnetic poles aligned in coupling proximity to the poles of the permanent magnets in the disc. Also employed are bearings and mounting apparatus for the purposes of holding registration between the disc and the stator as well as for providing mechanical power output through a central shaft. Further employed is at least one sensor which could be a photocell gate, a Hall effect sensor, or any other means of sensing the position of the permanent magnets in the rotor relative to the electromagnets in the stator along with transistor amplification circuitry for amplifying the signal from the sensor and imputing pulses of electricity into the stator electromagnets to cause the rotor to rotate.

According to the present invention, the stator electromagnets may be provided with several sets of windings having different wire diameters in which the thicker wire windings can be selectively activated to increase motor torque once RPM values reduce the motor currents to a safe level that will not demagnetize the permanent magnets in the rotor. Further, the large brushless DC motor may employ a rotor consisting of two or more rotor discs mounted onto a single central shaft. The DC motor may be configured such that the output of power takes place at the edge by gear teeth in place of the central shaft, or at the edge by a cog belt pulley.

Alternatively, the large diameter brushless DC electric motor of the present invention may comprise a thin disc-shaped rotor or rotatable portion and a stator or stationary portion. The rotator may be comprised of a disc having permanent magnets mounted along the edge with their poles transversing through the disc, and short flexible fan blades protruding radially from the edge of the disc. The stator portion of the motor may consist of C-shaped electromagnets which straddle the disc and are mounted having their magnetic poles aligned in coupling proximity to the poles of the permanent magnets in the disc. Also employed are bearings and mounting apparatus for the purposes of holding registration between the disc and the stator as well as for providing mechanical power output through a central shaft. Further employed is at least one sensor which could be a photocell gate, a Hall effect sensor, or any other means of sensing the position of the permanent magnets in the rotor relative to the electromagnets in the stator along with transistor amplification circuitry for amplifying the signal from the sensor and imputing pulses of electricity into the stator electromagnets to cause the rotor to rotate.

According to another embodiment of the present invention, the large diameter brushless DC electric motor may comprise a thin disc-shaped rotor or rotatable portion and a stator or stationary portion. The rotor may be comprised of a disc having sections of non-magnetizable high permeability material such as soft iron around the perimeter and transversing through the disc, and short flexible fan blades protruding radially from the edge of said disc. The stator portion of the motor may consist of C-shaped electromagnets which straddle the disc and are mounted having their magnet poles aligned in coupling proximity to the faces of the sections of non-magnetizable high-permeability material in the disc. Also employed are bearings and mounting apparatus for the purposes of holding registration between the disc and the stator as well as for providing mechanical power output through a central shaft. Further employed is at least one sensor such as a photocell gate or other means of sensing the position of the non-magnetizable high-permeability material in the rotor relative to the electromagnets in the stator along with transistor amplification circuitry for amplifying the signal from the sensor and imputing pulses of electricity into the stator electromagnets to cause the rotor to rotate.

DETAILED DESCRIPTION OF THE PREFERRED EMBODIMENTS

Figure 1:
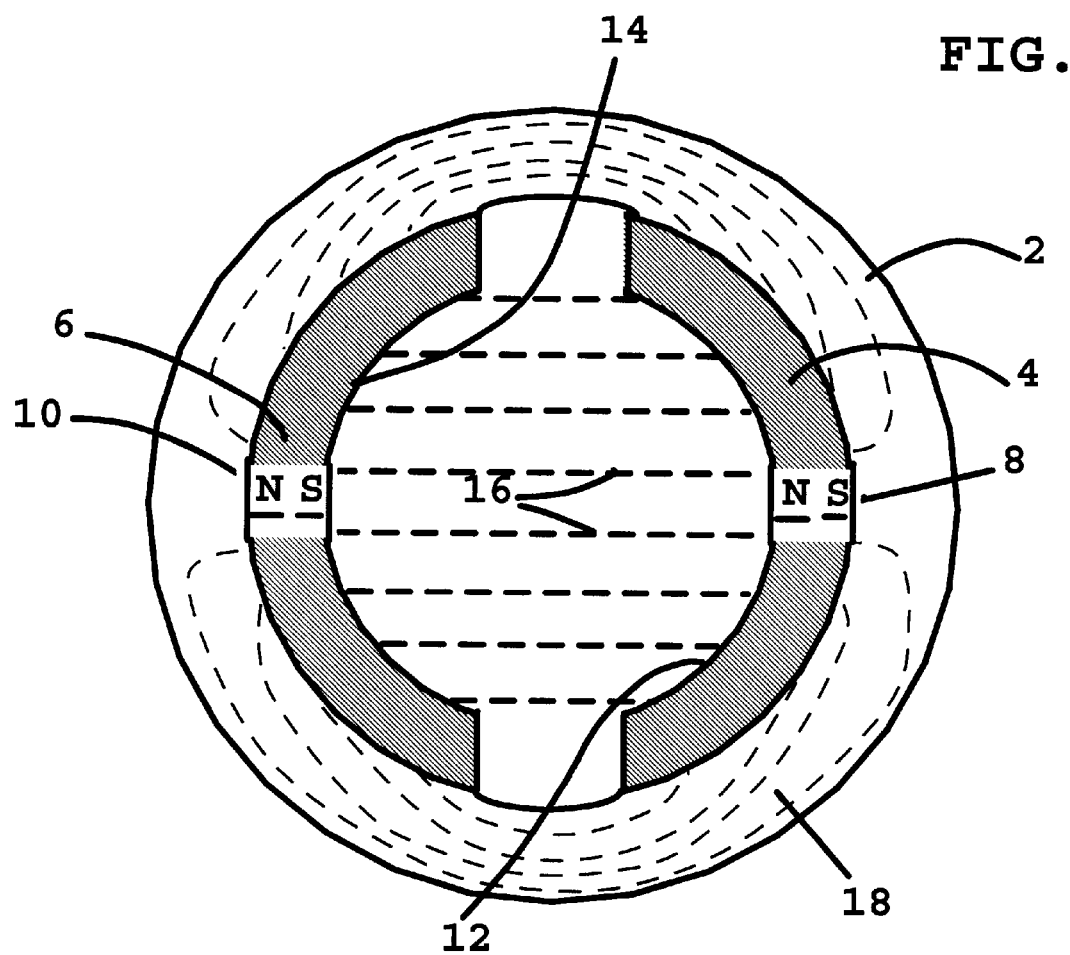
FIG. 1 shows the magnetic flux paths in the stator assembly of a brush timed permanent magnet DC electric motor.

FIG. 1 shows the open magnetic circuit in the stator portion of a traditional permanent magnet DC motor. Encased in thick steel housing 2 are permanent magnets 4 and 6 having opposite poles 8 and 10 against housing 2. Also shown are permanent magnet poles 12 and 14 which are aligned with each other across air gap 16. Also shown are lines of magnetic flux 18 which travel both through the motor housing 2 as well as through air gap 16. Thus, the completion of flux lines 18 from permanent magnets 4 and 6 requires a thick magnetic motor housing 2 as part of the magnetic circuit.

Figure 2:
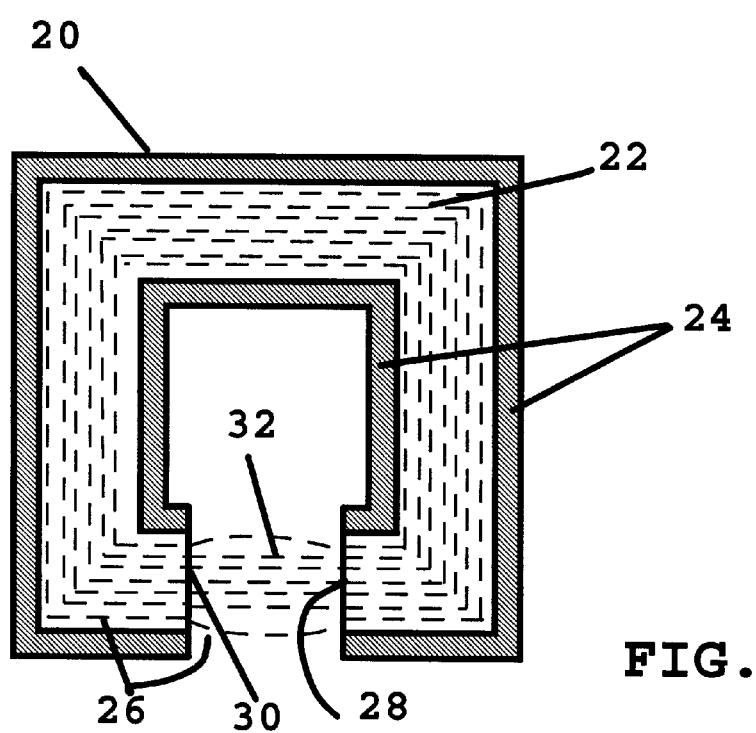
FIG. 2 shows the magnetic flux path of one of the stator electromagnet assemblies of this invention.

FIG. 2 shows the flux path produced by stator electromagnet 20 in the electric motor of this invention. Stator electromagnet 20 consists of a magnetic core 22 in the shape of a "C" which is wound with electromagnet wire 24. When electromagnet windings 24 are energized, magnetic flux 26 is generated in accordance with the right-hand rule of electrically induced magnetism. The magnetic flux 26 that is generated is contained within core 22 and emerges from pole faces 28 and 30. With the electromagnet geometry shown in FIG. 2, the magnet flux generated remains entirely within air gap 32 of the electromagnet 20. The electromagnet geometry of this invention is based on a Rowland ring. A Rowland ring was named after J. H. Rowland who made use of it in his experimental work on electricity and magnetism. A Rowland ring consists of a torroidal coil of wire wrapped around an iron core. The unique property of a Rowland ring is that the magnetic flux generated is confined wholly to the core. The electromagnet design shown in FIG. 2 is a Rowland ring which has been modified into an electromagnet by removing a section to produce an air gap having opposite magnet poles on each side.

Figure 3:
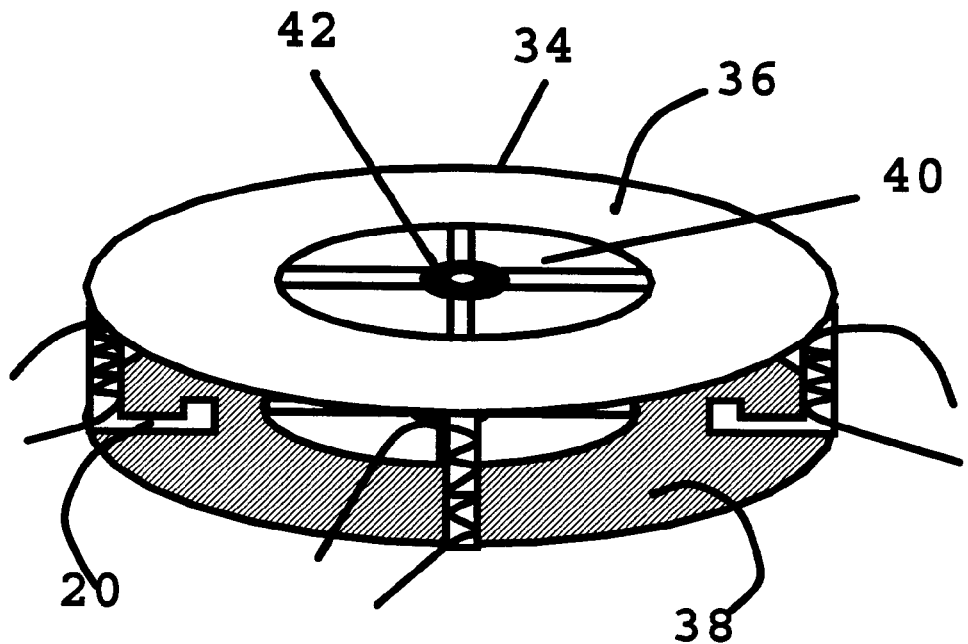
FIG. 3 shows a detailed drawing of the stator portion of the motor of this invention.

FIG. 3 shows the stator portion 34 of the high powered air cooled DC motor of this invention. Several electromagnets 20 are mechanically fastened to end plates 36 and 38. Also shown is an opening 40 in end plate 36 which allows air to flow through the motor for the purposes of cooling. Also shown is a bearing 42 for the purposes of providing a mechanical surface for supporting the rotatable motor shaft of the rotor portion.

Figure 4:
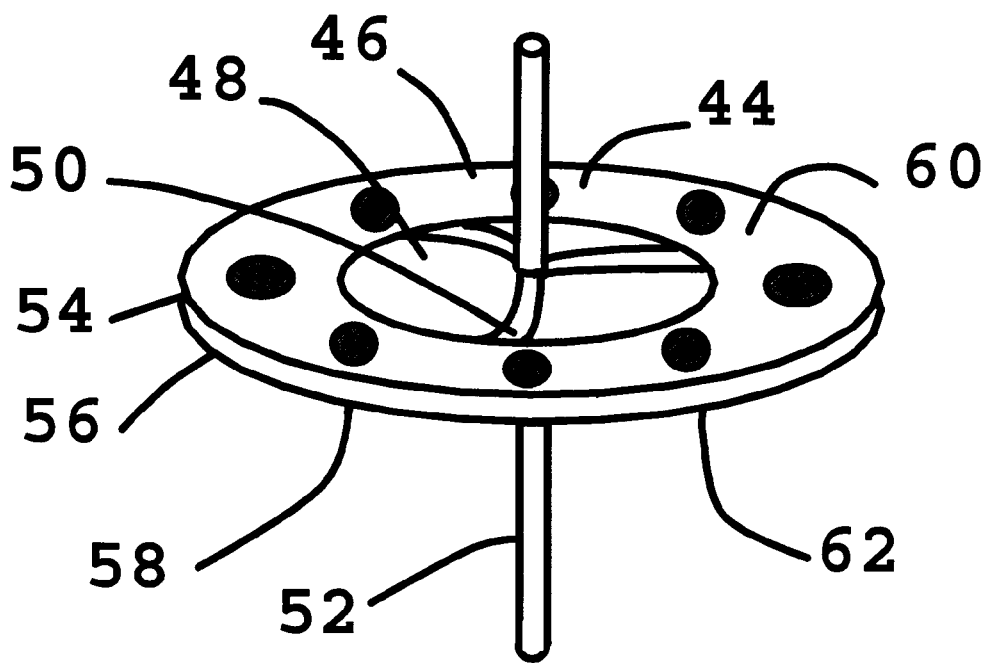
FIG. 4 shows the rotary disc portion of the motor of this invention with built in impeller.

FIG. 4 shows the rotary disc portion of the motor of this invention 44 which consists of an outer portion 46 and an inner turbofan portion 48. Inner turbofan portion 48 consists of individual blades 50 connecting a central axle 52 to edge portion 46. Edge portion 46 has several permanent magnets 54 mounted having their magnetic pole faces 56 and 58 on opposite sides 60 and 62 of outer disc portion 46.

Figure 5:
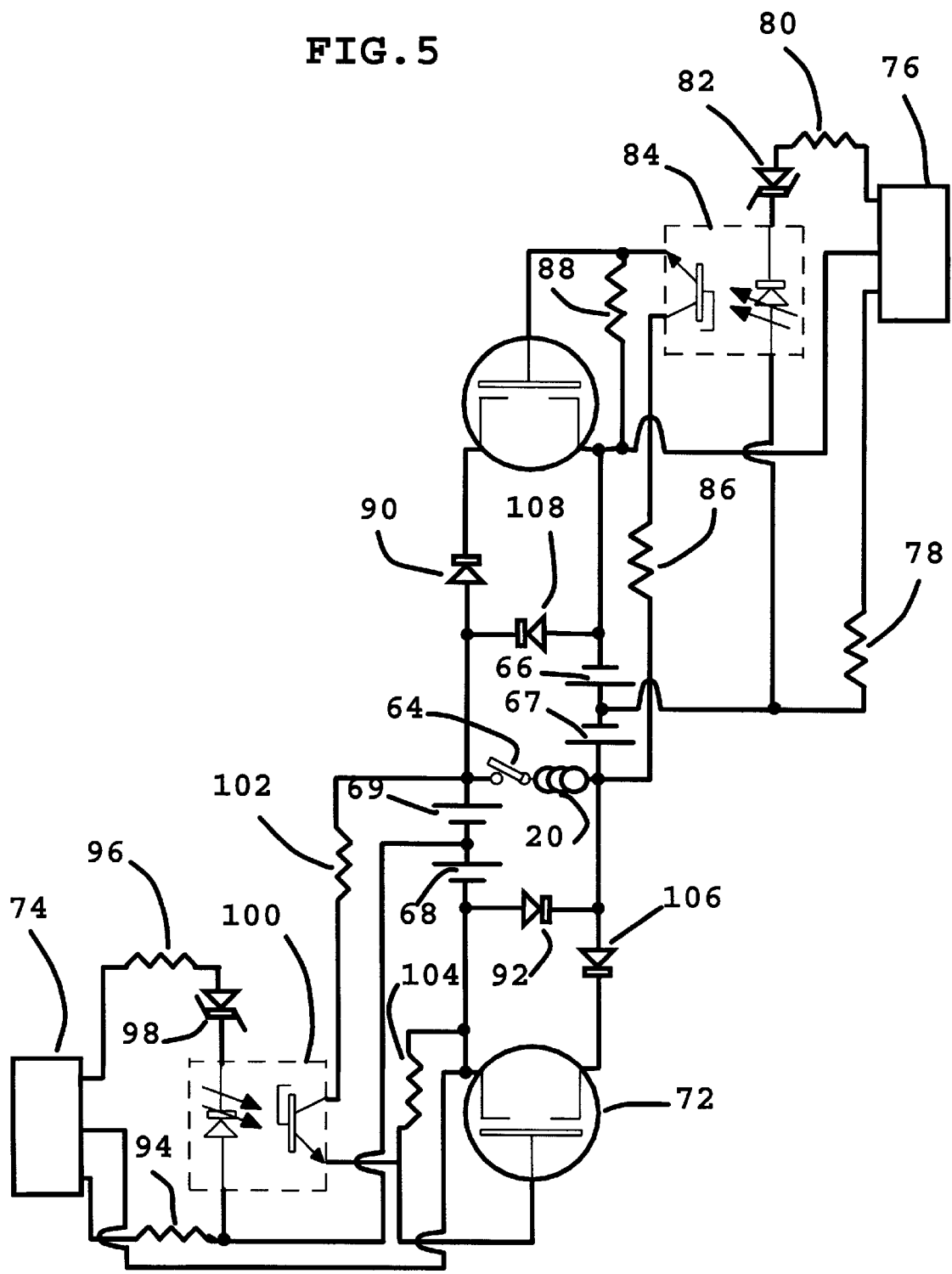
FIG. 5 shows a diagram of circuitry needed to drive the high-powered DC turbofan cooled motor of this invention.

FIG. 5 shows a circuit diagram for properly timing and supplying power to the stator electromagnets of this invention in order to drive the rotor. The circuit serves to initially energize the coil of electromagnet 20 in one direction to pull an adjacent permanent magnet into the field of the electromagnet, and then reverses the energization applied to coil 24 to push the permanent magnet out of the electromagnet 20 and to pull the next permanent magnet forward. When permanent magnet 54 passes the Hall effect sensor 76, power from battery 66 flows through resistors 78 and 80 and Zener diode 82 to activate opto-isolator 84. The phototransistor portion of opto-isolator 84 is wired to the gate portion of MOSFET power transistor 70 through biasing resistor 86. Biasing resistor 86 in turn is connected to the positive side of battery 67. Resistor 88 connects the gate of MOSFET power transistor 70 to the negative side of battery 66 and serves two purposes. One purpose is to discharge the gate capacitance of transistor 70 for rapid turn off; and the other purpose is to divide the battery voltage to the gate to allow for low gate turn-on voltages with relatively high battery voltages.

Thus, when Hall effect sensor 76 is activated by permanent magnet 54, transistor 70 is turned on with full power. Power from batteries 66 and 67 is then delivered to electromagnet 20 through diode 90. Electromagnet 20 then moves the wheel forward by pulling permanent magnet 54 into its field. When permanent magnet 54 approaches its equilibrium position, Hall effect sensor 76 is shut off. The unused magnetic energy stored in the electromagnet shows up as a reverse EMF spike. Diode 90 isolates transistor 70 from this spike. Diode 92 then shunts this spike into batteries 67 and 68 to give them a slight charge. Permanent magnet 54 passes by Hall effect sensor 74, switching power from battery 68 though resistors 94 and 96 and Zener diode 98 to activate opto-isolator 100. The phototransistor portion of opto-isolator 100 is wired to the gate portion of MOSFET power transistor 72 through biasing resistor 102. Biasing resistor 102 in turn is connected to the positive side of battery 69. Resistor 104 connects the gate of MOSFET power transistor 72 to the negative side of battery 68 for the purposes of draining the gate capacitance of MOSFET power transistor 72 when the gate voltage is shut off and divides the gate voltage used to maintain a safe operating level at the gate. Thus when Hall effect sensor 74 is activated by permanent magnet 54, MOSFET power transistor 72 is turned on with full power. Power from batteries 68 and 69 is then delivered to electromagnet 20 through diode 106, in the opposite direction from that supplied through transistor 70. Electromagnet 20 moves the rotor forward by pushing permanent magnet 54 out of its field, and pulling the next successive permanent magnet into the field. Once permanent magnet 54 has been sufficiently moved out of the field of electromagnet 20, Hall effect sensor 74 shuts off power to the circuit. Stored magnetic energy left in electromagnet 20 shows up as a back EMF spike which is isolated from MOSFET power transistor 72 by diode 106 and is shunted across diode 108 into batteries 66 and 67, thus completing the cycle.

Figure 6:
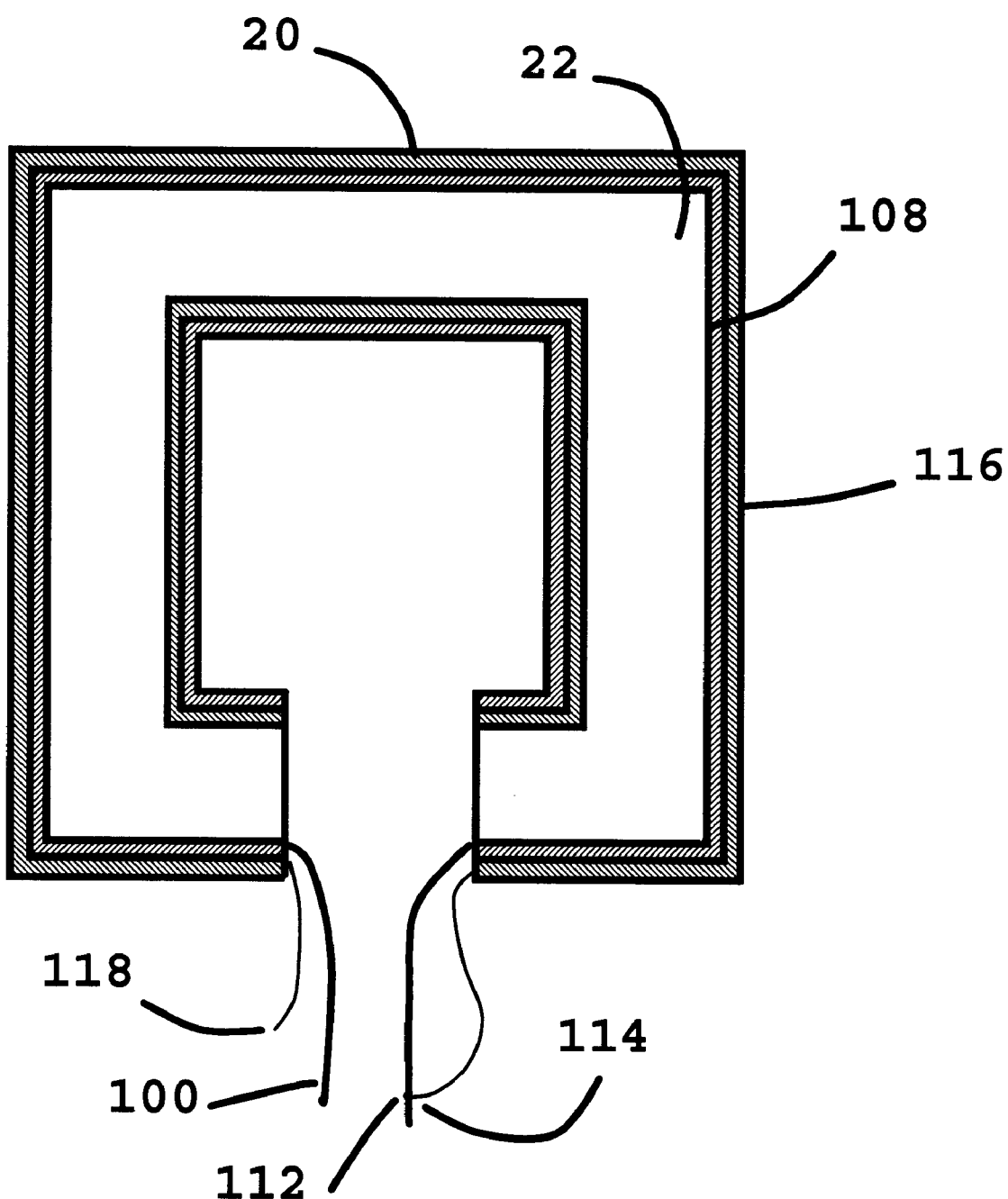
FIG. 6 shows a stator electromagnet having multiple windings of differing wire diameter for increasing motor torque at high RPM values.

FIG. 6 shows one of the stator electromagnets 20 of the high-powered turbofan cooled DC motor of this invention. Electromagnet 20 consists of a laminated iron core 22 in the shape of a "C" which is wrapped with a single layer of heavy gauge electromagnet wire 108 having ends 100 and 112. End 112 is then electrically connected to one end 114 of a lower gauge electromagnet wire 116 which is wound in a second layer over the heavy gauge wire to give a free exposed end 118.

Figure 7:
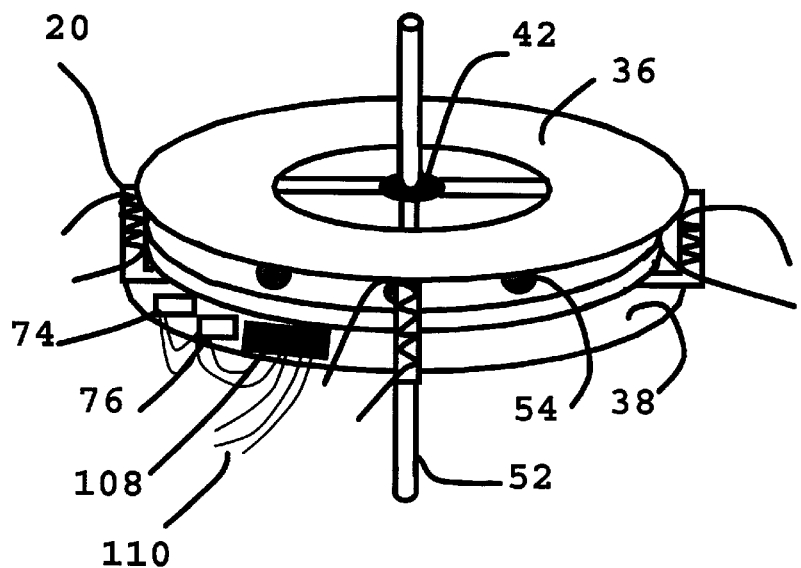
FIG. 7 shows an overall diagram of the high-powered DC turbofan cooled motor of this invention.

FIG. 7 shows a diagram of the complete motor of this invention. Rotor disc 44 along the central shaft 52 is surrounded by electromagnets 20 straddling the edge of disc 44 in alignment with permanent magnets 54 in the rotary disc portion. Further employed are bearings 42 in end plates 36 and 38. End plates 36 and 38 together with electromagnets 20 provide the stationary part of this motor. Hall effect sensors 74 and 76 provide the timing for amplification circuitry 108 and is distributed to electromagnets 20 by wires 110.

Figure 8:
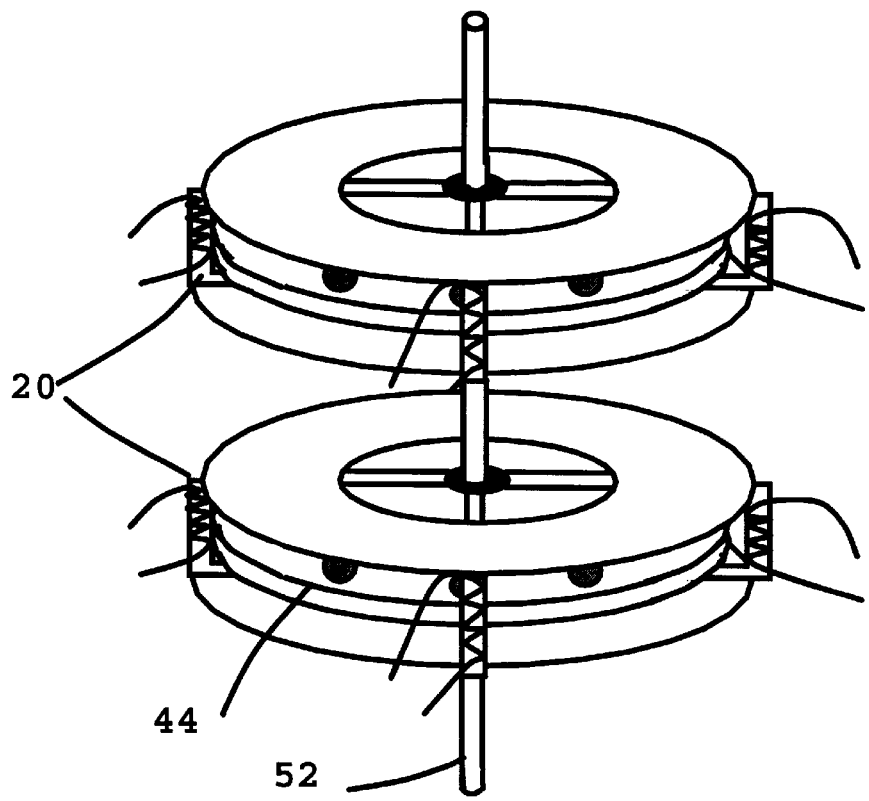
FIG. 8 shows an overall diagram of the high-powered DC turbofan cooled motor of this invention having two rotor discs mounted onto the same central shaft.

FIG. 8 shows two discs 44 on a single shaft 52. Each disc is driven by its own set of electromagnets 20. This geometry provides high torque in a package having a limited diameter and also results in an overall reduction in inertia mass.

Figure 9:
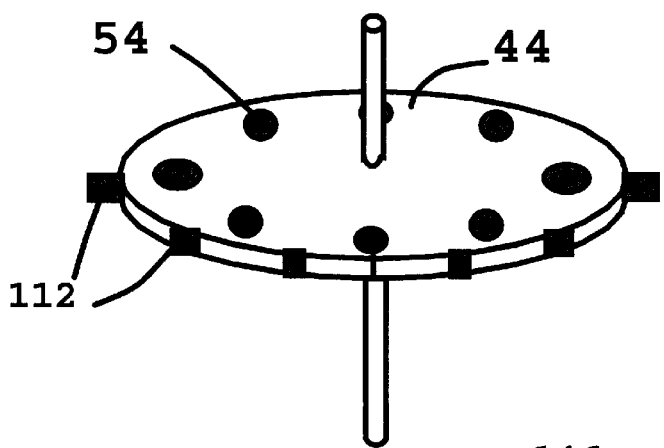
FIG. 9 shows a diagram of the armature of the motor of this invention having short flexible blades emanating radially from the edge of the rotor which allows for adequate cooling under low RPM values but which limits air flow under high RPM values to prevent excess power consumption.

FIG. 9 shows a rotor disc 44 having permanent magnets 54 mounted in the same configuration as those shown in FIG. 4. The disc of FIG. 9 does however have a solid center and fan blades 112 along the edge to provide direct cooling to the electromagnets (now shown). Fan blades 112 may be made of a flexible material such as mylar, kapton, or other polymer film. The flexible fan blades allow for high air flow at low RPM values and reduce aerodynamic drag at high RPM values.

Figure 10:
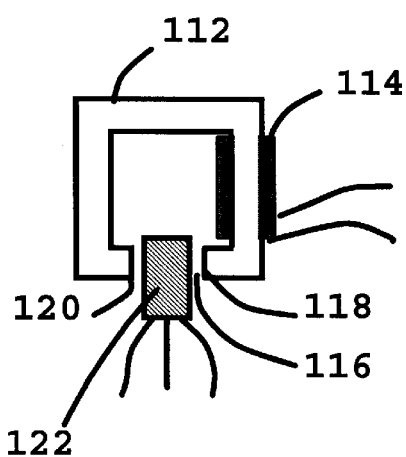
FIG. 10 shows a current sensing device which prevents accidental demagnetization of the rotor permanent magnets at low speeds.

FIG. 10 shows an example of current limiting circuitry suitable for preventing accidental demagnetization of rotor permanent magnets 54 (not shown). A small laminated iron core 112 having slot 116 is provided with several turns of heavy gauge wire 114. Magnetic poles 118 and 120 are formed when current flows through wire 114. Into slot 116 is placed a Hall effect sensor 122 having Schmidt Triggering Circuitry which is used to sense the magnetic field present within gap 116. Windings 114 on iron core 112 are wired in series with electromagnet 20 (not shown). When an unacceptable amount of current flows through windings 114, the magnetic field generated in small iron core 112 activates Hall effect sensor 122 which grounds out the gate of the corresponding MOSFET power transistor providing power to electromagnet 20 and momentarily cuts off the current. The Schmidt triggering aspect of Hall effect sensor 122 is advantageous in switching the power transistors on and off rapidly in place of reducing the constant current flow on a continuous basis. Such switching results in virtually no voltage drop across circuit elements and allows the MOSFET drive transistors to run cool even under current limiting conditions.

Figure 11:
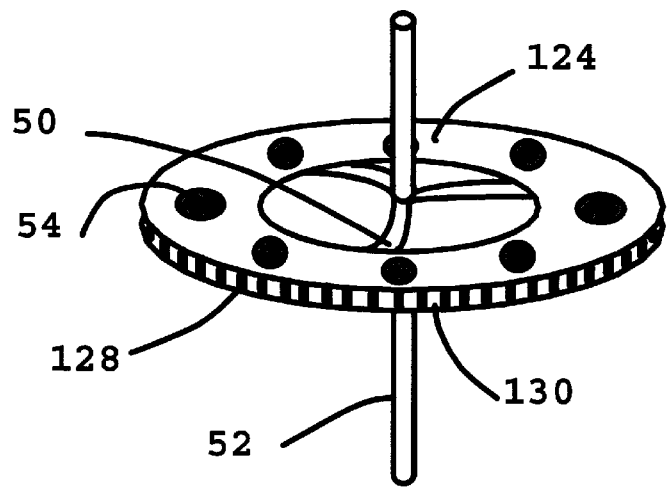
FIG. 11 shows the rotary portion of the motor of this invention having a toothed edge for engagement to a gear or cog belt.

In FIG. 11, rotary disc 124 consists of an outer disc portion 126 fixedly mounted to a central shaft 52 by turbofan blades 50. Outer disc portion 126 has permanent magnets 54 fixedly mounted into outer disc portion 126 with their direction of magnetization transversing through the disc. Also shown are high and low areas 128 and 130 cut into the periphery of outer disc portion 126. These high and low areas may be in the form of gear-type teeth or other teeth suitable for engaging a cog-type belt or other suitable mechanical drive mechanism capable of engaging the outer edge of outer disc portion 126. It should be noted that in some instances several electromagnets (not shown) may have to be removed to allow for mechanical coupling from the edge.

Figure 12:
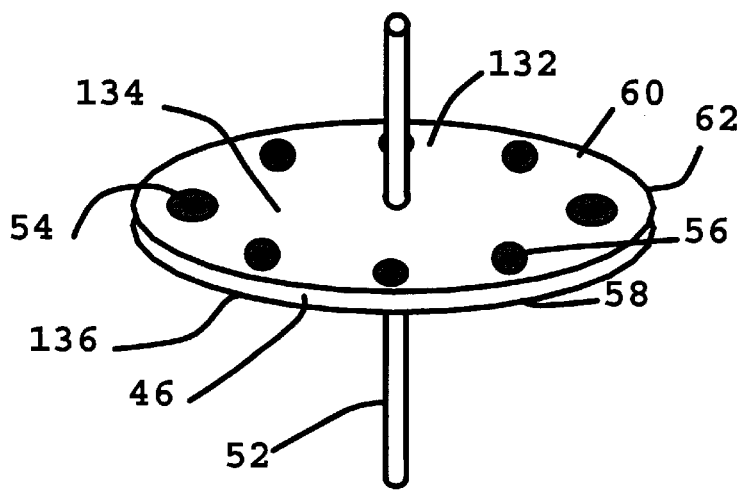
FIG. 12 shows the rotary portion of the motor of this invention consisting of a disc having a smooth surface.

FIG. 12 shows a large diameter disc-shaped rotor 132 having smooth top and bottom surfaces 134 and 136 respectively. Also shown are permanent magnets 54 in edge portion 46 of rotor 132. Permanent magnets 54 are mounted having their magnetic pole faces 56 and 58 on opposite sides 60 and 62 of outer disc portion 46. Also shown is shaft 52.

Figure 13:
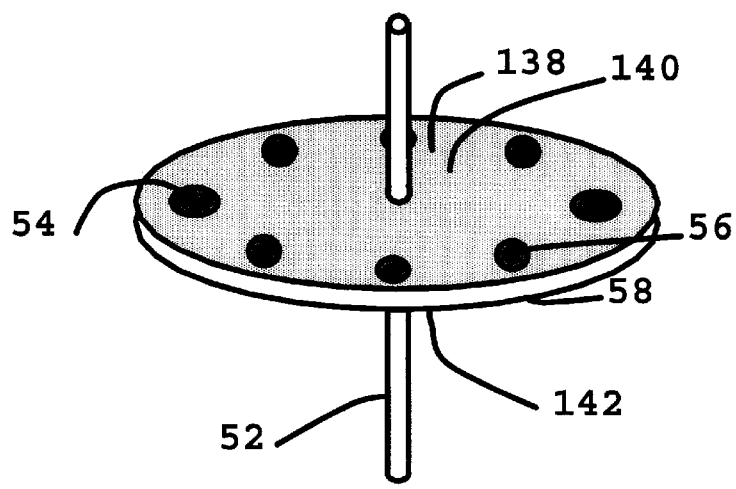
FIG. 13 shows the rotary portion of the motor of this invention consisting of a disc having a roughened surface to increase airflow.

FIG. 13 shows a large diameter disc-shaped rotor 138 having rough textured top and bottom surfaces 140 and 142. Located in the periphery of disc 138 are several permanent magnets 54 mounted having their magnetic pole faces 56 and 58 on opposite sides 140 and 142 of disc 138. As usual shaft 52 is used for power output and registration within the motor.

Figure 14:
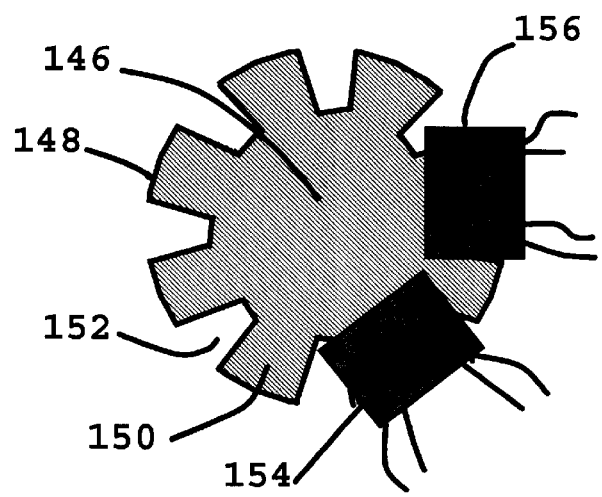
FIG. 14 shows the top view of an optical encoder disc along with photocell gates to provide timing for the high power motor of this invention.

FIG. 14 shows the top view of an optical encoder disc 144 having a central portion 146 and an edge portion 148. Edge portion 148 consists of alternating opaque areas 150 and transparent areas 152. Also shown are two photocell gates 154 and 156 used to provide a signal for timing purposes.

Figure 15:
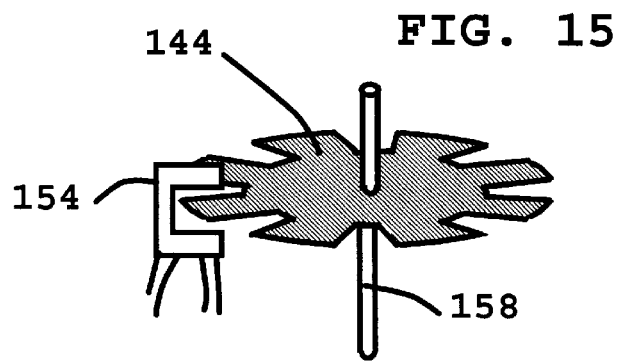
FIG. 15 shows a tilted view of an optical encoder disc and photocell gate used to provide timing for the high power motor of this invention.

FIG. 15 shows a tilted view of optical encoder disc 144 and photocell gate 154. Also shown is shaft 158 which is directly fastened to the end of the motor shaft (not shown).

Figure 16:
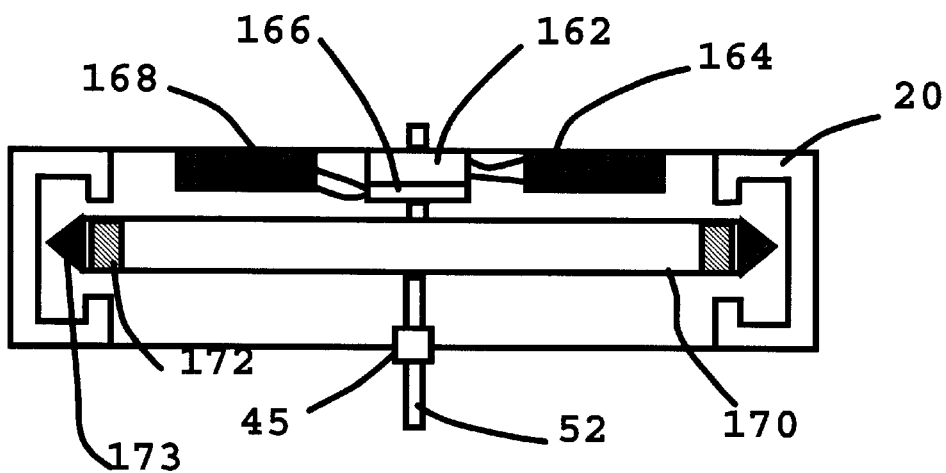
FIG. 16 shows a side view of the high power motor of this invention including a small generator on the shaft for speed sensing, speed sensing circuitry, optical timing circuitry, and amplification circuitry.

FIG. 16 shows a side view of the disc rotor air cooled motor of this invention. Disc rotor motor 160 is shown in complete form. This particular motor includes a small electric generator 162 which senses the rotor speed by generating a voltage which is proportional to the speed. Generator 162 is of the permanent magnet type and therefore requires no field windings and therefore no input power. Such a generator can be either of the DC output type, or conversely the AC output type. In the case of permanent magnet DC output generators, a simple permanent magnet motor will often suffice. Although many speed sensing methods may be employed, the generator offers the best protection against failed circuit components. Such failure can cause premature shunting of electromagnet windings resulting in the potential for demagnetization of rotor permanent magnets. The generator absolutely will not put out a given voltage until a minimum RPM value has been achieved. Failure of the generator results in low or no output voltage. This failure mode will not result in premature shunting problems. Generator 162 can be wired to a relay to either automatically shunt electromagnet taps at a particular speed, or interlock out the accidental premature shunting of electromagnet taps. Generator 162 of motor 160 is wired to a control box 164. Control box 164 contains interlocking circuitry. Beneath generator 162 of motor 160 is optical encoder 166. Optical encoder 166 is mounted to motor shaft 152. The optical encoder itself is shown in detail in FIGS. 14 and 15 previously described. Optical encoder 166 is wired to amplification circuitry 168 which amplifies the signal from optical encoder 166 and inputs the amplified signal into electromagnets 20.

Supported on motor shaft 52 is rotary disc 170 having portions of high permeability magnetic material 172 transversing through the edge portion of disc 170. FIG. 16 particularly illustrates the plurality of C-shaped electromagnets 20 configured to define an inner annular channel 173. The annular edge portion of disc 170 is rotatably disposed within in annular channel 173. In the case of a permanent magnet motor design, high permeability magnetic material 172 consists of permanent magnets. In the case of a switched reluctance motor design, non-magnetizable ferrite, laminated silicon steel, or powdered iron composite may be employed. Also shown are flexible plastic fan blades 112 which provide air currents to cool electromagnets 20. Motor end plates 36 and 38 provide support for motor shaft 52, electromagnets 20, and motor bearings 42. The permanent magnets are disposed on the annular edge portion of disc 170 so that the directions of magnetization thereof transverse through disc 170. In addition, the poles of the permanent magnets are aligned in coupling proximity to the poles of the electromagnets of the stator.

Figure 17:
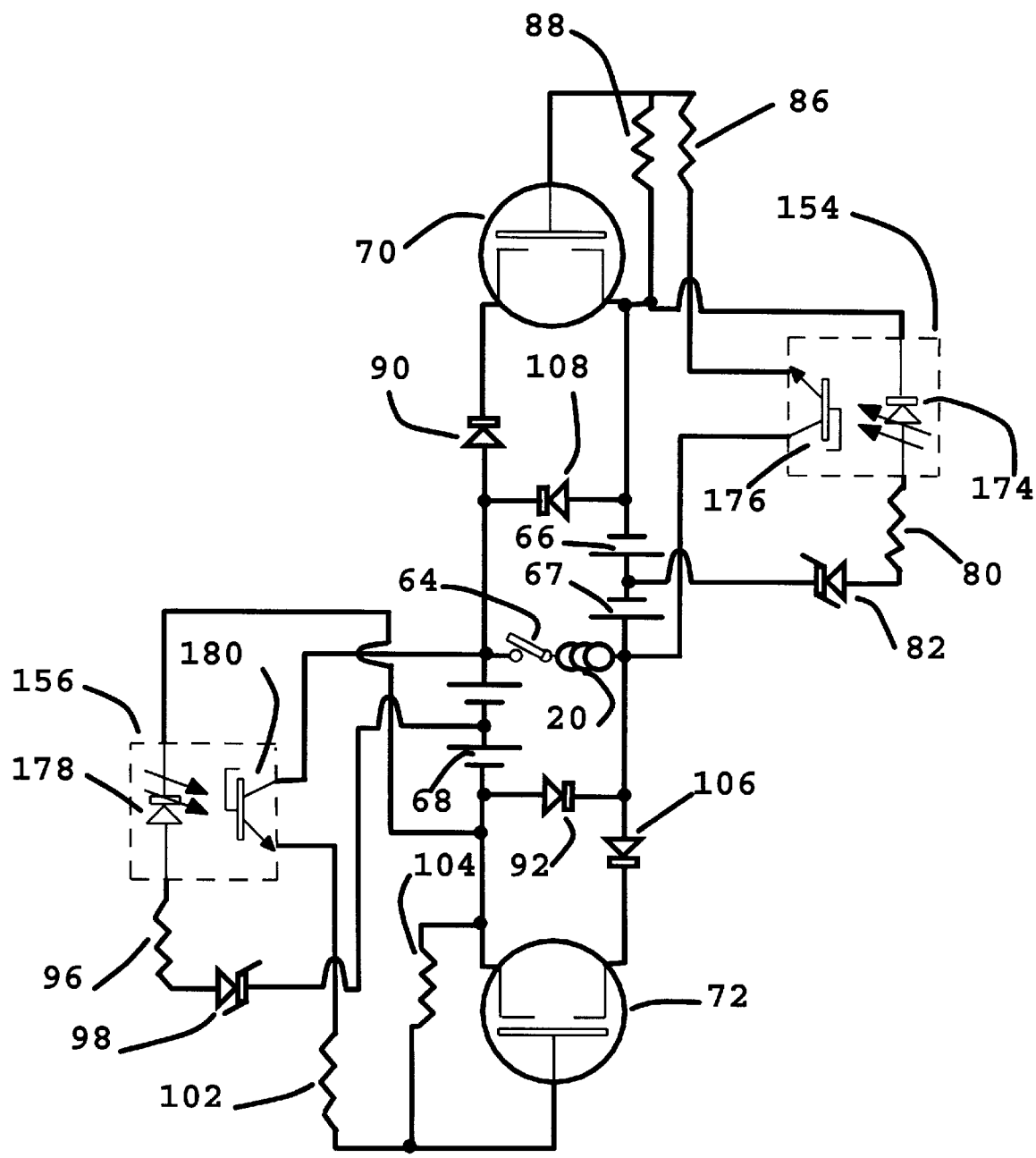
FIG. 17 is a schematic diagram showing optical timing circuitry integrated with transistor amplification circuitry which provides power to the electromagnets in the motor of this invention.

FIG. 17 shows optical timing circuitry integrated with transistor amplification circuitry which provides power to the electromagnets in the motor of this invention. Optical timing gate 154 consists of a light emitting diode 174 and a phototransistor 176 separated by a gap through which the optical timing disc passes (not shown) such optical gates are commercially available from Omron Electronics, Inc., located at One East Commerce Drive Schaumburg, Ill. 60173. Part No. EESG3 is a suitable optical timing gate, although many others will work as well. The motor timing should be 40% on time from sensor 154, then 10% off time, then 40% on time from sensor 156, then 10% off time to complete the cycle. The motor timing itself will vary with the desired operating parameters, but in general the electromagnets should be turned on slightly early with respect to rotor position.

Optical timing gate 154 has its output transistor portion 176 wired to the gate portion of MOSFET power transistor 70. The choice of the exact MOSFET power transistor will depend on the requirements of the particular motor. International Rectifier located at 233 Kansas Street, El Segundo, Calif. 90245 makes a variety of Hexfet MOSFET power transistors. One should be chosen with a low on resistance, and a rated operating voltage of at least twice the voltage used in the motor. The current rating capacity should be several times the normal running current through the device. For example, for an operating voltage of 24 volts, IRFZ48 would be a good choice. This particular transistor has an on resistance of 0.018 ohms, a source to drain voltage of 60 volts, and a continuous current rating of 72 amperes. Proper heat sinking is also recommended. Resistors 86 and 88 provide voltage dividing to the gate of MOSFET power transistor 70. These values should be chosen to properly divide the gate voltage, allow for quick turn on and turn off, and not drain excessive battery power. In general they should be chosen to provide 1 milliampere of switching current. Resistor 88 also drains the gate capacitance of MOSFET power transistor 70 when the gate voltage is shut off by optical sensor 154. This allows for clean switching.

When mechanical switch 64 is closed, electromagnet 20 is controlled by MOSFET switching transistors 70 and 72. Light emitting diode 174 is on continuously from voltage supplied from battery 66 and is controlled by Zener diode 82 and resistor 80. When a transparent portion of the optical timing disc (not shown) passes by optical timing gate 154, LED portion 174 transmits its light to photo transistor 176. Phototransistor 176 turns on and power flows through voltage dividing resistors 86 and 88. This turns on MOSFET power transistor 70 thereby providing power from batteries 66 and 67 through diode 90 and into electromagnet 20. The interaction of the magnetic field produced by electromagnet 20 and the magnetic material in the rotor provides propulsive force to the edge of the rotor thereby providing mechanical power. Just before the magnetic material in the rotor(not shown) aligns itself in the magnetic field in the electromagnet, optical sensing gate 154 is shut off by an opaque region of the optical timing disc (not shown). MOSFET power transistor 70 is then shut off. Remaining stored magnetic energy in electromagnet 20 then shows up as a reverse voltage spike. Diode 90 isolates MOSFET power transistor 70 from this spike while diode 92 shunts this reverse voltage spike into batteries 68 and 69 giving them a slight charge. As the magnetic material in the rotor passes by its equilibrium position with respect to electromagnet 20, optical sensing gate 156 is turned on as a transparent portion of the optical timing disc (not shown) passes through. Light emitting diode 178 is on continuously from voltage supplied from battery 68 and is controlled by Zener diode 98 and resistor 96. Light from light emitting diode 178 in optical sensing gate then activates phototransistor 180 thereby supplying voltage to the gate of MOSFET power transistor 72 through voltage dividing resistors 102 and 104. MOSFET power transistor 72 then turns on supplying power from batteries 68 and 69 to electromagnet 20 through diode 106. The interaction of the magnetic field provided by electromagnet 20 and the magnetic material in the rotor provides further propulsive force to the edge of the rotor thereby providing mechanical power. Just before the magnetic material in the rotor (not shown) aligns itself in the magnetic field in the electromagnet, Optical sensing gate 156 is shut off by an opaque region of the optical timing disc (not shown). MOSFET power transistor 72 is then shut off. Remaining stored energy in electromagnet 20 then shows up as a reverse voltage spike. Diode 106 isolates MOSFET power transistor 72 from this spike while diode 108 shunts this reverse voltage spike into batteries 67 and 68 thus completing the cycle.

The timing of actual switching is fundamentally different between a disc rotor having permanent magnets and that of a disc rotor having non-magnetizable high permeability material. In the first case, permanent magnets can be made to repel as well as attract simply by changing the direction of current flowing through electromagnet 20. In the second case of switched-reluctance, attraction is the only net force. The two transistor circuitry however is advantageous in driving such switched-reluctance motor designs in that utilization of reverse voltage spikes is easily achieved which also reduces arcing of switch contacts.

Figure 18:
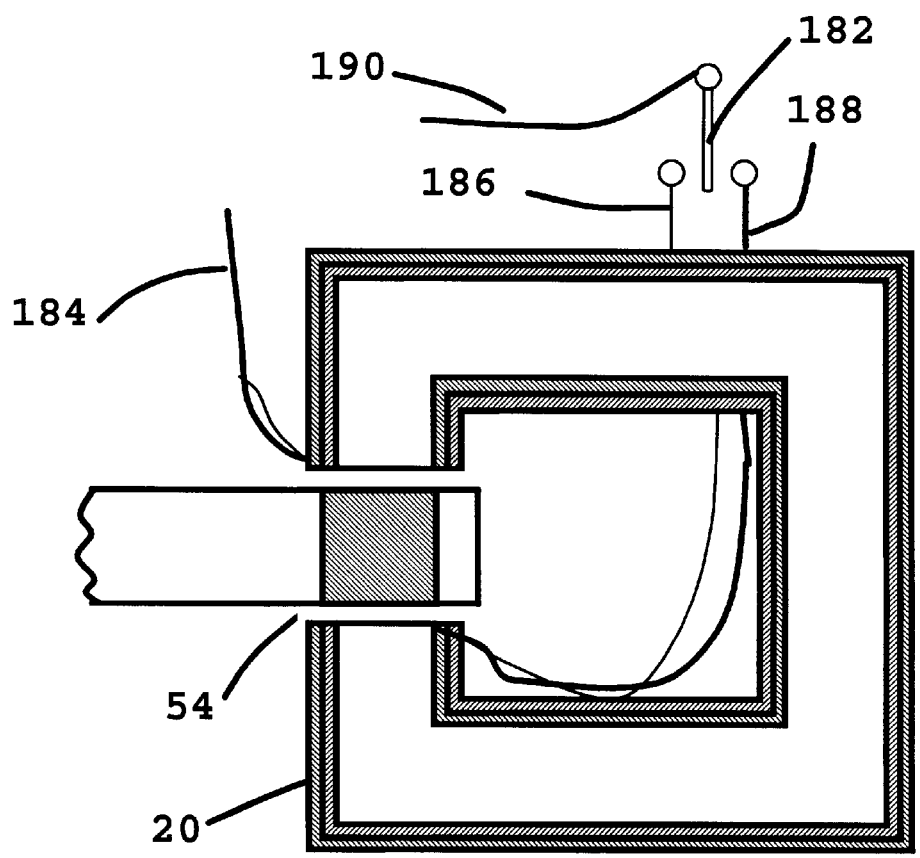
FIG. 18 shows an electromagnet assembly including switching circuitry having thick wire wrapped around the core to a first tap, and thinner wire wrapped over the thick wire to a second tap.

FIG. 18 shows an electromagnet assembly 20 with an SPDT switch 182. Also shown is a common wire 184 and two tapped input leads 186 and 188. 188 output lead is thick wire wound around the electromagnet core. Output lead 186 is the tap corresponding to the second layer of wire to be wrapped around the electromagnet core and is of a thinner gauge than that of the first layer of wire. The output lead from SPDT switch 182 is 190. Thus output leads 184 and 190 of electromagnet 20 form a multiple tap electromagnet in conjunction with SPDT switch 182. On motor start up SPDT switch 182 connects lead 190 to electromagnet lead 186. The entire length of electromagnet wire is activated. The thin outer layer of wire connected to lead 186 prevents excessive electromagnet currents from demagnetizing permanent magnet 54. Once a safe rotor speed has been achieved, SPDT switch 182 can be switched to electromagnet tap 188 thus shunting the entire length of thin electromagnet wire 186. This will substantially increase rotor power, speed, and torque.

Figure 19:
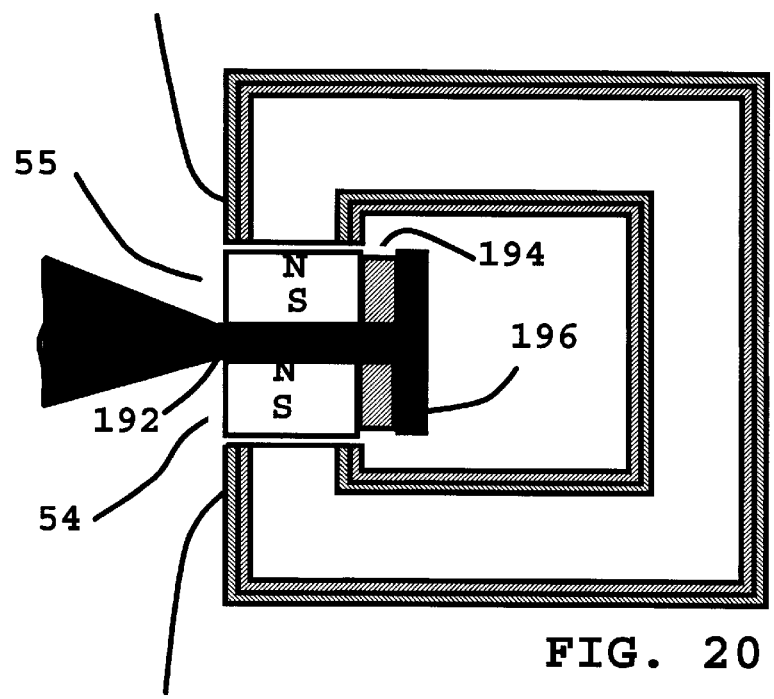
FIG. 19 shows a sectional view of the edge of the disc traveling through an electromagnet gap including permanent magnets sandwiching a flat steel spoke.

FIG. 19 shows a permanent magnet pair formed of permanent magnets 54 and 55 sandwiching a piece of steel 192. Steel piece 192 forms a flat planar spoke to provide a strong mechanical bond between the inner portion of the rotor and the periphery where the permanent magnets are located. Also shown is a piece of non-magnetic material 194 which provides support for permanent magnets 54 and 55 during running. Non-magnetic material 194 also provides separation distance from T-shaped steel piece 196 thus preventing a short circuit of their magnetic flux.

Figure 20:
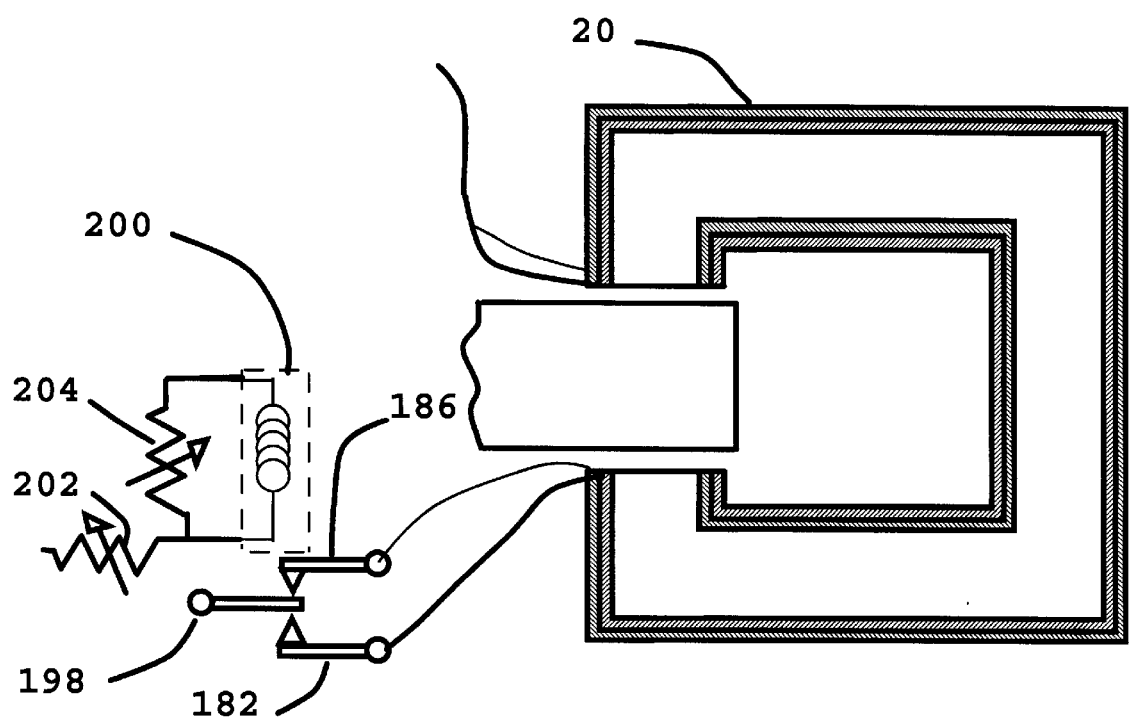
FIG. 20 shows a multitap electromagnet having the tap selection controlled by a relay which receives a voltage signal from a small electric generator.

FIG. 20 shows multiple tap electromagnet 20 interfaced to relay 198 for either interlocking of or automatic switching of electromagnet taps 182 and 186 based on a voltage input from a generator (not shown) to relay coil 200. Variable resistors 202 and 204 control the activation voltage of relay 198.

Figure 21:
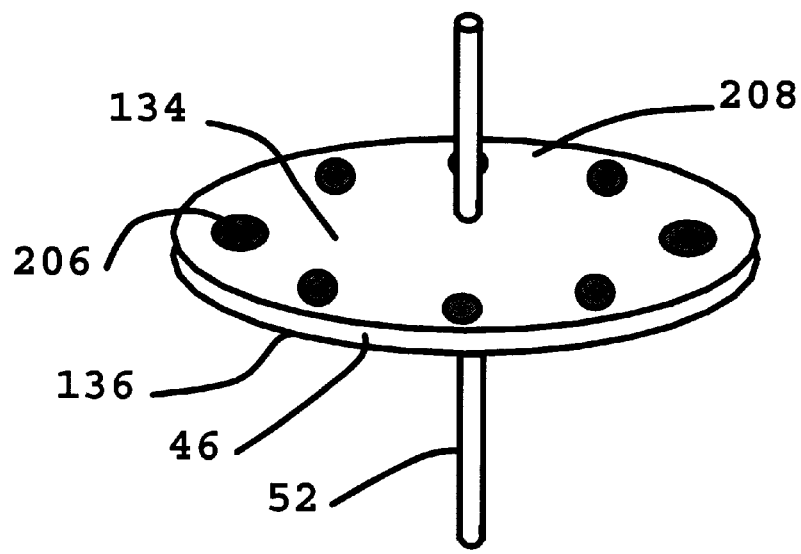
FIG. 21 shows a smooth rotary disc rotor of this invention incorporating a non-magnetizable high permeability material in the periphery to provide mechanical power by switch-reluctance.

FIG. 21 shows a large diameter disc-shaped rotor 208 having smooth top and bottom surfaces 134 and 136 respectively. Also shown are sections of high permeability non-magnetizable ferromagnetic material 206 in edge portion 46 of rotor 208. Also shown is shaft 52.

Figure 22:
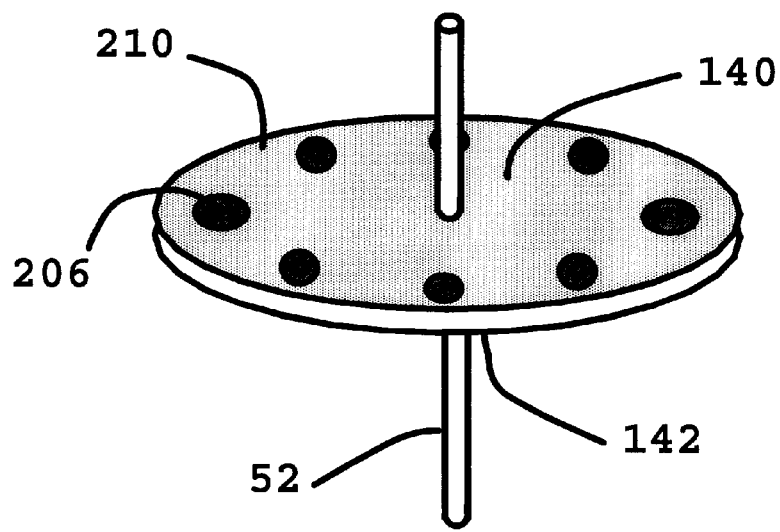
FIG. 22 shows a rotary disc rotor having a rough texture surface incorporating a non-magnetizable high permeability material in the periphery to provide mechanical power by switch-reluctance.

FIG. 22 shows a large diameter disc-shaped rotor 210 having rough textured top and bottom surfaces 140 and 142. Located in the periphery of disc 210 are sections of high permeability non-magnetizable ferromagnetic material 206. As usual shaft 52 is used for power output and registration within the motor.

Those skilled in the art will understand that the embodiments of the present invention described above exemplify the present invention and do not limit the scope of the invention to these specifically illustrated and described embodiments. The scope of the invention is determined by the terms of the appended claims and their legal equivalents, rather than by the described examples. In addition, the exemplary embodiments provide a foundation from which numerous alternatives and modifications may be made, which alternatives and modifications are also within the scope of the present invention as defined in the appended claims.

What is claimed is:

1. A brushless direct current (DC) electric motor comprising:

a stationary portion including a plurality of C-shaped electromagnets disposed to define an inner annular channel, each of said electromagnets having poles;

a rotatable portion including:

a shaft rotatable with respect to said stationary portion:

at least one disc mounted to said shaft, said disc having an annular portion rotatably disposed within said inner annular channel of said stationary portion; and a plurality of permanent magnets each having a direction of magnetization and poles, said plurality of permanent magnets being disposed on said annular portion of said disc so that the directions of magnetization thereof transverse through said disc and so that the poles thereof are aligned in coupling proximity to the poles of said electromagnets; and position circuitry for sensing a position of said plurality of permanent magnets with respect to said plurality of electromagnets and for providing a signal based on said position to said plurality of electromagnets to cause said rotatable portion to rotate:

said disc including roughened surfaces for increasing air motion when rotating.

2. A motor as claimed in claim 1 wherein said disc includes vanes which protrude radially beyond said annular portion.

3. A motor as claimed in claim 1 wherein said disc includes a centrally disposed turbo fan.

4. A motor as claimed in claim 1 wherein said plurality of permanent magnets includes ceramic magnets.

5. A motor as claimed in claim 1 wherein said plurality of permanent magnets includes rare earth magnets.

6. A motor as claimed in claim 5 wherein said plurality of permanent magnets includes magnets made of neodymium iron boron.

7. A motor as claimed in claim 5 wherein said plurality of permanent magnets includes magnets made of cobalt samarium.

8. A motor as claimed in claim 1 wherein each of said plurality of electromagnets includes a center tap and a switch configured with a predetermined number of turns of wire being shuntable to reduce inductance.

9. A brushless direct current (DC) electric motor comprising:

a stationary portion including a plurality of C-shaped electromagnets disposed to define an inner annular channel, each of said electromagnets having poles;

a rotatable portion including:

a shaft rotatable with respect to said stationary portion;

at least one disc mounted to said shaft, said disc having an annular portion rotatably disposed within said inner annular channel of said stationary portion; and a plurality of permanent magnets each having a direction of magnetization and poles, said plurality of permanent magnets being disposed on said annular portion of said disc so that the directions of magnetization thereof transverse through said disc and so that the poles thereof are aligned in coupling proximity to the poles of said electromagnets; and position circuitry for sensing a position of said plurality of permanent magnets with respect to said plurality of electromagnets and for providing a signal based on said position to said plurality of electromagnets to cause said rotatable portion to rotate;

each of said plurality of electromagnets including a center tap and a switch configured with a predetermined number of turns of wire being shuntable to reduce inductance;

each of said plurality of electromagnets including a first wire extending from a core to a first tap and a second wire from said first tap to an outer lead;

said first wire being larger in diameter than said second wire.

10. A motor as claimed in claim 8 further comprising:

speed circuitry for sensing a rate at which said disc rotates and for shunting a predetermined number of turns of wire of said plurality of electromagnets when said disc rotates at a rate greater than a predetermined value.

11. A motor as claimed in claim 10 wherein said speed circuitry includes an electric generator.

12. A motor as claimed in claim 9 further comprising:
a speed sensor for sensing a rate at which said disc rotates; and
interlocking circuitry connected to said speed sensor for preventing premature shunting of said plurality of electromagnets to said center tap when said disc is rotating below a predetermined operating speed.

13. A motor as claimed in claim 12 wherein said speed sensor is an electric generator.

14. A motor as claimed in claim 12 wherein said speed sensor is a current sensor for sensing when currents reach a predetermined unsafe level.

15. A motor as claimed in claim 1 wherein said rotatable portion includes a plurality of said discs mounted on said shaft.

16. A motor as claimed in claim 1 wherein said disc includes gear teeth disposed on said annular portion for outputting power.

17. A motor as claimed in claim 1 wherein said disc includes a cog belt pulley disposed on said annular portion for outputting power.

18. A motor as claimed in claim 1 wherein said disc includes:
a plurality of substantially planar ferromagnetic spokes disposed between a central portion of said disc and said annular portion; and
a plurality of permanent magnets disposed on sides of each of said spokes.

19. A brushless direct current (DC) switched-reluctance electric motor comprising:
a stationary portion including a plurality of C-shaped electromagnets disposed to define an inner annular channel, each of said electromagnets having poles;
a rotatable portion including:
a shaft rotatable with respect to said stationary portion;
at least one disc mounted to said shaft, said disc having an annular portion rotatably disposed within said inner annular channel of said stationary portion; and
a plurality of sections each being made from a non-magnetizable high-permeability material having a direction of magnetization and poles, said non-magnetizable high-permeability material being disposed on said annular portion of said disc so that the directions of magnetization thereof transverse through said disc and so that the poles thereof are aligned in coupling proximity to the poles of said electromagnets;
mounting apparatus for holding registration between said disc and said stationary portion and for providing mechanical power output through said shaft; and
position circuitry for sensing a position of said plurality of sections of said rotatable portion with respect to said plurality of electromagnets and for providing a signal based on said position to said plurality of electromagnets to cause said rotatable portion to rotate;
said disc including roughened surfaces for increasing air motion when rotating.

20. A motor as claimed in claim 19 wherein said disc includes flexible vanes protruding radially from said annular portion to provide airflow at relatively low rates of rotation.

21. A motor as claimed in claim 19 wherein said disc includes a centrally disposed turbo fan.

22. A motor as claimed in claim 19 wherein each of said plurality of electromagnets includes a center tap and a switch configured with a predetermined number of turns of wire being shuntable to reduce inductance.

23. A motor as claimed in claim 19 further comprising:
speed circuitry for sensing a rate at which said disc rotates and for shunting a predetermined number of turns of wire of said plurality of electromagnets when said disc rotates at a rate greater than a predetermined value.

24. A motor as claimed in claim 23 wherein said speed circuitry includes an electric generator.

25. A motor as claimed in claim 9 wherein said disc includes roughened surfaces for increasing air motion when rotating.

26. A motor as claimed in claim 9 wherein said disc includes flexible vanes protruding radially from said annular portion to provide airflow at relatively low rates of rotation.

27. A brushless direct current (DC) electric motor comprising:
a stationary portion including a plurality of C-shaped electromagnets disposed to define an inner annular channel, each of said electromagnets having poles;
a rotatable portion including:
a shaft rotatable with respect to said stationary portion;
at least one disc mounted to said shaft, said disc having an annular portion rotatably disposed within said inner annular channel of said stationary portion, said disc including:
a plurality of substantially planar ferromagnetic spokes disposed between a central portion of said disc and said annular portion; and
a plurality of permanent magnets disposed on sides of each of said spokes; and
a plurality of permanent magnets each having a direction of magnetization and poles, said plurality of permanent magnets being disposed on said annular portion of said disc so that the directions of magnetization thereof transverse through said disc and so that the poles thereof are aligned in coupling proximity to the poles of said electromagnets; and
position circuitry for sensing a position of said plurality of permanent magnets with respect to said plurality of electromagnets and for providing a signal based on said position to said plurality of electromagnets to cause said rotatable portion to rotate.

28. A motor as claimed in claim 27 wherein said disc includes vanes which protrude radially beyond said annular portion.

29. A motor as claimed in claim 27 wherein said disc includes a centrally disposed turbo fan.

30. A motor as claimed in claim 27 wherein said plurality of permanent magnets includes ceramic magnets.

31. A motor as claimed in claim 27 wherein said plurality of permanent magnets includes rare earth magnets.

32. A motor as claimed in claim 27 wherein each of said plurality of electromagnets includes a center tap and a switch configured with a predetermined number of turns of wire being shuntable to reduce inductance.

33. A motor as claimed in claim 27 wherein said rotatable portion includes a plurality of said discs mounted on said shaft.

34. A motor as claimed in claim 27 wherein said disc includes gear teeth disposed on said annular portion for outputting power.

35. A motor as claimed in claim 27 wherein said disc includes a cog belt pulley disposed on said annular portion for outputting power.

36. A brushless direct current (DC) switched-reluctance electric motor comprising:
- a stationary portion including a plurality of C-shaped electromagnets disposed to define an inner annular channel, each of said electromagnets having poles;
- a rotatable portion including:
  - a shaft rotatable with respect to said stationary portion;
  - at least one disc mounted to said shaft, said disc having an annular portion rotatably disposed within said inner annular channel of said stationary portion; and
  - a plurality of sections each being made from a non-magnetizable high-permeability material having a direction of magnetization and poles, said non-magnetizable high-permeability material being disposed on said annular portion of said disc so that the directions of magnetization thereof transverse through said disc and so that the poles thereof are aligned in coupling proximity to the poles of said electromagnets;
  - mounting apparatus for holding registration between said disc and said stationary portion and for providing mechanical power output through said shaft; and
- position circuitry for sensing a position of said plurality of sections of said rotatable portion with respect to said plurality of electromagnets and for providing a signal based on said position to said plurality of electromagnets to cause said rotatable portion to rotate;
- each of said plurality of electromagnets including a center tap and a switch configured with a predetermined number of turns of wire being shuntable to reduce inductance.

37. A motor as claimed in claim 36 wherein said disc includes flexible vanes protruding radially from said annular portion to provide airflow at relatively low rates of rotation.

38. A motor as claimed in claim 36 wherein said disc includes a centrally disposed turbo fan.

39. A motor as claimed in claim 36 further comprising:
speed circuitry for sensing a rate at which said disc rotates and for shunting a predetermined number of turns of wire of said plurality of electromagnets when said disc rotates at a rate greater than a predetermined value.

* * * * *